US008275890B2

(12) United States Patent
Burckart et al.

(10) Patent No.: US 8,275,890 B2
(45) Date of Patent: Sep. 25, 2012

(54) DETECTING AN INACTIVE CLIENT DURING A COMMUNICATION SESSION

(75) Inventors: Erik J. Burckart, Raleigh, NC (US); Andrew J. Ivory, Wake Forest, NC (US); Todd E. Kaplinger, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 12/477,370

(22) Filed: Jun. 3, 2009

(65) Prior Publication Data

US 2010/0313078 A1    Dec. 9, 2010

(51) Int. Cl.
*G06F 15/16* (2006.01)

(52) U.S. Cl. ....................... 709/227; 709/237

(58) Field of Classification Search .................. 709/200, 709/201–203, 217–219, 223–237
See application file for complete search history.

(56) References Cited

U.S. PATENT DOCUMENTS

| 5,633,916 | A  | * | 5/1997  | Goldhagen et al. ......... 379/88.17 |
| 6,789,119 | B1 | * | 9/2004  | Zhu et al. ....................... 709/227 |
| 6,880,013 | B2 | * | 4/2005  | Kashyap ........................ 709/227 |
| 7,024,394 | B1 | * | 4/2006  | Ashour et al. ................... 705/64 |
| 7,404,210 | B2 | * | 7/2008  | Lin ................................ 726/22 |
| 7,526,556 | B2 | * | 4/2009  | Banerjee et al. .............. 709/227 |
| 7,535,845 | B2 | * | 5/2009  | Bou-Diab et al. ............ 370/238 |
| 7,577,749 | B1 | * | 8/2009  | Long .............................. 709/230 |
| 7,698,364 | B2 | * | 4/2010  | Andrew et al. ................ 709/204 |
| 7,788,369 | B2 | * | 8/2010  | McAllen et al. ............... 709/224 |
| 7,810,089 | B2 | * | 10/2010 | Sundarrajan et al. ......... 717/174 |
| 7,822,837 | B1 | * | 10/2010 | Urban et al. ................... 709/223 |
| 2002/0073152 | A1 | * | 6/2002  | Andrew et al. ................ 709/204 |
| 2002/0087697 | A1 | * | 7/2002  | Kashyap ........................ 709/227 |
| 2002/0116266 | A1 | * | 8/2002  | Marshall ......................... 705/14 |
| 2002/0138627 | A1 | * | 9/2002  | Frantzen et al. .............. 709/227 |
| 2004/0062267 | A1 | * | 4/2004  | Minami et al. ................ 370/463 |
| 2005/0135306 | A1 | * | 6/2005  | McAllen et al. ............... 370/329 |
| 2005/0138428 | A1 | * | 6/2005  | McAllen et al. ............... 713/201 |
| 2005/0192822 | A1 | * | 9/2005  | Hartenstein et al. ............. 705/1 |
| 2006/0085429 | A1 | * | 4/2006  | Wener et al. .................... 707/10 |
| 2006/0195547 | A1 | * | 8/2006  | Sundarrajan et al. ......... 709/217 |
| 2006/0195605 | A1 | * | 8/2006  | Sundarrajan et al. ......... 709/232 |

(Continued)

FOREIGN PATENT DOCUMENTS

WO          9839868  A2     9/1998

OTHER PUBLICATIONS

International Searching Authority, International Search Report and Written Opinion for International Application No. PCT/EP2010/057238, Mailed Oct. 26, 2010, pp. 1-10.

(Continued)

*Primary Examiner* — Patrice Winder
*Assistant Examiner* — Julian Chang
(74) *Attorney, Agent, or Firm* — Law Office of Jim Boice

(57) ABSTRACT

A communication session is established between a first device and a second device. A message is transmitted from the first device to the second device. In response to the second device failing to actively respond to the message, the first device terminates the communication session with the second device.

19 Claims, 4 Drawing Sheets

U.S. PATENT DOCUMENTS

| | | | |
|---|---|---|---|
| 2006/0195840 A1* | 8/2006 | Sundarrajan et al. | 717/176 |
| 2006/0200849 A1* | 9/2006 | Sundarrajan et al. | 725/110 |
| 2006/0248581 A1* | 11/2006 | Sundarrajan et al. | 726/12 |
| 2006/0253605 A1* | 11/2006 | Sundarrajan et al. | 709/238 |
| 2007/0058599 A1* | 3/2007 | Harsch | 370/338 |
| 2007/0168420 A1* | 7/2007 | Morris | 709/204 |
| 2007/0192325 A1* | 8/2007 | Morris | 707/10 |
| 2007/0192415 A1* | 8/2007 | Pak | 709/206 |
| 2007/0244987 A1* | 10/2007 | Pedersen et al. | 709/217 |
| 2007/0245409 A1* | 10/2007 | Harris et al. | 726/5 |
| 2009/0210748 A1* | 8/2009 | Hohmann et al. | 714/32 |
| 2009/0292766 A1* | 11/2009 | Morris | 709/203 |
| 2010/0058064 A1* | 3/2010 | Kirovski et al. | 713/176 |
| 2010/0211626 A1* | 8/2010 | Li | 709/203 |

OTHER PUBLICATIONS

Heidemann, J. et al. "Modeling the Performance of HTTP Over Several Transport Protocols", IEEE/ACM Transactions on Networking, IEEE/ACM, New York, NY, US, vol. 5, No. 5, Oct. 1, 1997, pp. 616-630.

* cited by examiner

DETECTING AN INACTIVE CLIENT DURING A COMMUNICATION SESSION

BACKGROUND

The present disclosure relates to the field of computers, and specifically to computer networks. Still more particularly, the present disclosure relates to communication sessions on computer networks.

Computers can communicate among themselves by establishing communication sessions. A communication session is established by each computer in the session "knowing" information about the other computers (e.g., uniform resource locator (URL) or other address information, routing information, etc.) and about the communication session itself (e.g., the format (e.g., Hypertext Transfer Protocol—HTTP, etc.). In a non-persistent session, such as an HTTP transient session, a new communication session is opened for every request/response pair made between two computers. In a persistent session, such as an HTTP keep-alive session, the communication session remains open during multiple requests/responses between the two computers.

BRIEF SUMMARY

A persistent communication session is established between a first device and a second device. A message is transmitted from the first device to the second device. In response to the second device failing to actively respond to the message, the first device terminates the persistent communication session with the second device.

DETAILED DESCRIPTION

Figure 1A:
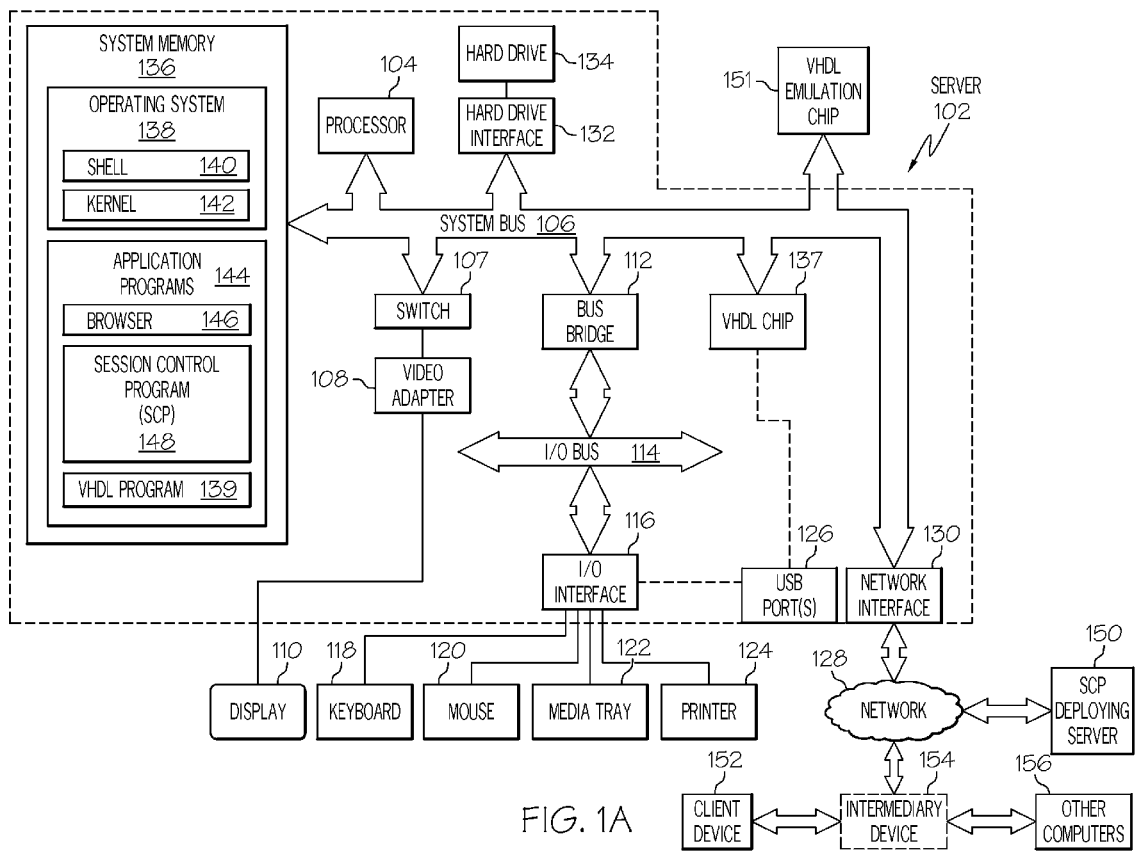
FIG. 1a depicts an exemplary computer in which the present invention may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java (JAVA is a registered trademark of Sun Microsystems, Inc. in the United States and other countries), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular to FIG. 1a, there is depicted a block diagram of an exemplary server 102, which may be utilized by the present invention. Note that some or all of the exemplary architecture, including both depicted hardware and software, shown for and within server 102 may be utilized by an SCP deploying server 150, a client device 152, an intermediary device 154, other computers 156, as well as client devices 160a-c and/or pub/sub server 164 shown in FIG. 1b.

Server 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., session control program—SCP 148 described below) that support the processes described herein.

System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of content server architecture, in a preferred embodiment some or all of these ports are universal serial bus (USB) ports.

As depicted, server 102 is able to communicate with a SCP deploying server 150 and a client device 152 via network 128 using a network interface 130. Network 128 may be an external network such as the Internet, or an internal network such as an Ethernet or a virtual private network (VPN). Server 102 is also able to communicate with at least one client device 152, either directly or via an intermediary device 154, such as a router, an internet service provider (ISP) server, etc.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in server 102. This volatile memory includes additional higher levels of volatile memory (not shown), including, but not limited to, cache memory, registers and buffers. Data that populates system memory 136 includes server 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., server 102) to send and receive network messages to the Internet using hypertext transfer protocol (HTTP) messaging, thus enabling communication with SCP deploying server 150 and other described content server systems.

Application programs 144 in server 102's system memory (as well as SCP deploying server 150's system memory) also include a content transfer management program (SCP) 148. SCP 148 includes code for implementing the processes described below, including those described in FIGS. 2-3. In one embodiment, server 102 is able to download SCP 148 from SCP deploying server 150, including in an on-demand basis. Note further that, in one embodiment of the present invention, SCP deploying server 150 performs all of the functions associated with the present invention (including execution of SCP 148), thus freeing server 102 from having to use its own internal computing resources to execute SCP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from SCP 148 causes VHDL program 139 to configure VHDL chip 137, which may be an FPGA, ASIC, etc.

In another embodiment of the present invention, execution of instructions from SCP 148 results in a utilization of VHDL program 139 to program a VHDL emulation chip 151. VHDL emulation chip 151 may incorporate a similar architecture as described above for VHDL chip 137. Once SCP 148 and VHDL program 139 program VHDL emulation chip 151, VHDL emulation chip 151 performs, as hardware, some or all functions described by one or more executions of some or all of the instructions found in SCP 148. That is, the VHDL emulation chip 151 is a hardware emulation of some or all of the software instructions found in SCP 148. In one embodiment, VHDL emulation chip 151 is a programmable read only memory (PROM) that, once burned in accordance with instructions from SCP 148 and VHDL program 139, is permanently transformed into a new circuitry that performs the functions needed to perform the process described below in FIGS. 2-3.

Note that the hardware and software described in FIG. 1a may be specifically used in one embodiment of a system that implements the present invention. For example, when utilized in conjunction with SCP 148 by server 102, a combination of processor 104 and network interface 130 may function as a suitably configured hardware device for controlling a persistent communication session by establishing a persistent communication session with a browser on a client device, wherein the persistent communication session initially remains open even if the browser on the client device is subsequently closed; transmitting a message to the client device; and in response to the client device failing to actively respond to the message, terminating the persistent communication session with the client device.

Note that the hardware described as exemplary logic for the functions described above are merely exemplary, and other hardware/software shown in FIG. 1a may be utilized to provide the same described and other logic necessary to perform the processes described herein by the present invention.

Figure 1B:
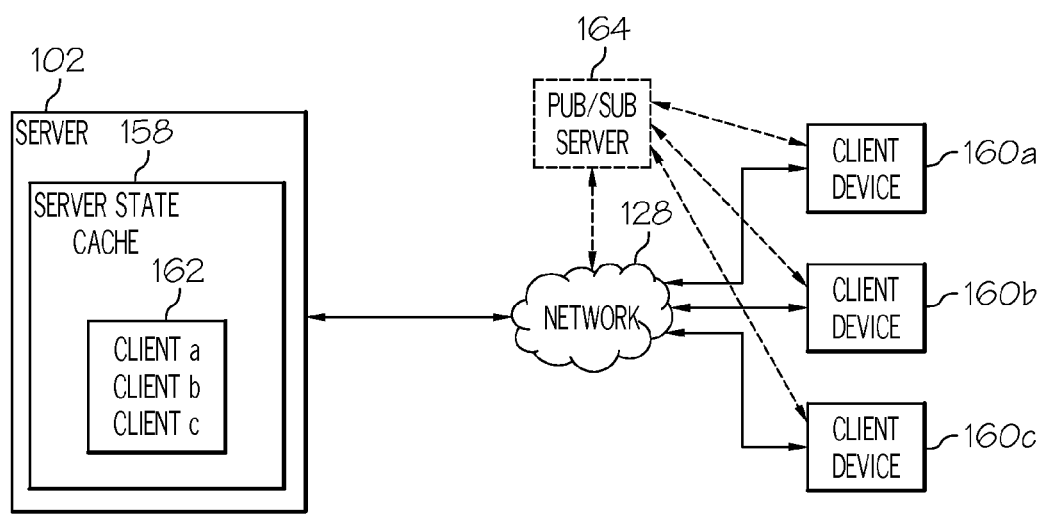
FIG. 1b illustrates an exemplary relationship between a server and clients during a communication session.

Referring now to FIG. 1b, a high-level overview of a relationship between server 102 and client devices 160a-c (where "c" is an integer) is presented. Client devices 160a-c represent exemplary multiple embodiments of client device 152 shown in FIG. 1a. Depicted within server 102 is a server state cache 158. Within server state cache 158 is stored a table 162 of client devices that are assumed to be involved in a current communication session with server 102. That is, even though the communication session between server 102 and one or more of the client devices 160a-c may be transient (wherein the underlying TCP/IP connection is not persistent and must be renewed for every packet transmitted), the server 102 still has all state data needed (i.e., client identifiers, routing information, addresses, etc.) to continue with the communication session. However, one or more of the client devices 160a-c may actually have been turned off, or at least their browser closed. In that scenario, server 102 does not know that one or more of the client devices 160a-c are no longer viable session parties. Thus, using methodology described below, server 102 will periodically interrogate the client devices 160a-c to determine which, if any of these devices, needs to be removed from table 162, and thus no longer be available to the current communication session.

In one embodiment of the present invention, a publish/subscribe (pub/sub) server 164 is utilized to maintain a persistent stateful connection between server 102 and client devices 160a-c in a manner described below.

Figure 2:
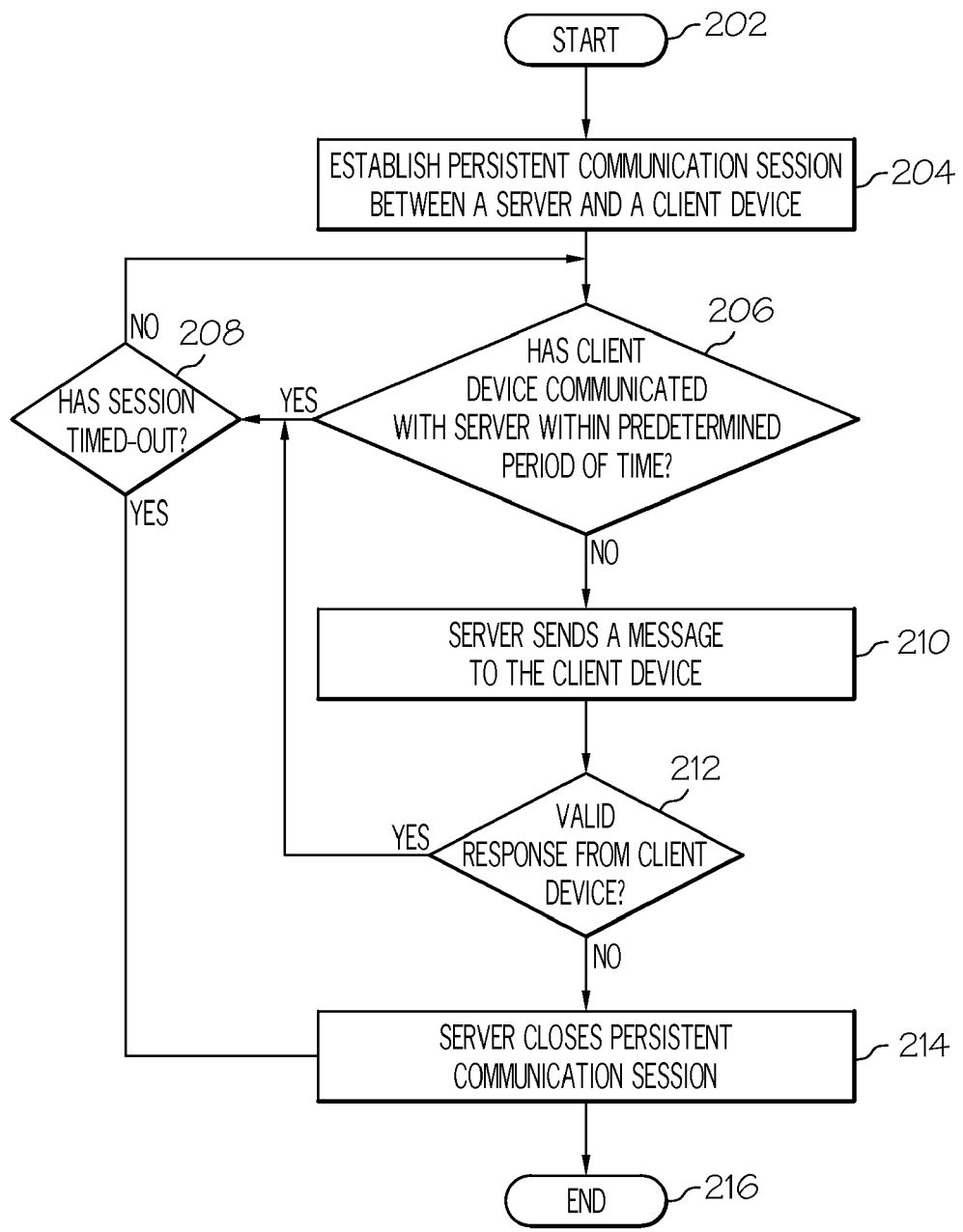
FIG. 2 is a high-level flow-chart of one or more exemplary steps taken by a processor to close a communication session between two computers.

With reference now to FIG. 2, a high-level flow-chart of exemplary steps taken to control and terminate a communication session between a first device (e.g., a server) and a second device (e.g., a client device) is presented. After initiator block 202 which may be prompted by a client device requesting that a communication session be established with a server, the server establishes that communication session (block 204). Note that in one embodiment, the persistent communication session is a non-persistent connection. That is, each communication between server 102 and one or more of the client devices 160a-c shown in FIG. 1b must be restored in a TCP/IP session, but while using the state information from the server state cache 158 shown in FIG. 1b. In another embodiment, this session is actually a persistent session, using a persistent connection as defined and supported by the protocol established by HTTP/1.1. Such a persistent connection is maintained between the pub/sub server 164 and the server 102 and client devices 160a-c. If utilizing HTTP/1.1 or similar protocols, this persistent communication session allows the client device and the server to exchange multiple messages (e.g., over a transfer control protocol—TCP transport layer) without having to re-establish the session for each message or message pair. However, in either scenario (persistent or non-persistent session), the semi-permanent nature of the persistent communication session results in the server "thinking" that the client device is still active (is on-line; and/or is receiving messages; and/or is physically turned on; and/or is still running a browser; etc.) even if it is not. Thus, the server does not "know" if the client device is still participating in the present communication session.

As shown in query block 206, if the client device has not communicated with the server during some period of time, then a query is made as to whether the communication session has timed out (query block 208). If so, then the server closes the communication session (block 214), and the process ends (terminator block 216). Note that, as suggested by query block 208, a communication session may be automatically timed out after some period of time. However, before that period of time elapses, the communication session remains active. Therefore, during this time period the client device may terminate the session by closing its browser, being turned off, etc. In this scenario, the session is closed, but the server still keeps state data about the client stored in its server state cache (e.g., the client's identification and other session state information is still stored within the server state cache 158 shown in FIG. 1b). Thus, without taking the following steps, server state cache 156 would be overpopulated, if not actually polluted, with client information.

Returning to query block 206, if the predetermined period of time has not elapsed, then the server transmits a message to the client device (block 210). This message may take on multiple forms and formats. However, the purpose of the message in accordance with one embodiment of the present invention is to determine whether the client device is still active. Therefore, the content (e.g., payload) of the message may be insignificant compared to how (or if) the client device responds to the message. Thus, a query is made as to whether the client device responded with a valid response (query block 212). This "valid response" is a logical response to a message, rather than an error message or some illogical response. For example, if the message is "Are you active?", then a valid response would be "Yes, I am still active." while an invalid response would be gibberish (e.g., "Three o'clock") or an error message. This error message can be generated in several ways, including, but not limited to, those now described for exemplary purposes. For example, in one embodiment, the error message is generated by the server in reaction to no valid response being returned from the client device within some period of time (e.g., three seconds). In another embodiment, the error message is generated by an interim device (e.g., intermediary device 154 shown in FIG. 1a), located between the client device and the server, determining that the client device is not on line. This interim transmission device may be, for example, a network server, an internet service provider (ISP) server, a router, etc. In another embodiment in which the persistent communication session is between the server and a browser on the client device, the client device itself may generate the error message in response to determining that its browser has been turned off. In another embodiment, the client device may generate the error message in response to determining that a necessary application for handling the message has been closed.

If a valid response is not returned from the client device within some predetermined amount of time (query block 212), then the server assumes that the client device is no longer active and closes the persistent communication session (block 214), thus ending the process (terminator block 216).

Note that in one embodiment, when the server closes the communication session with a browser-based client device (block 214), the server can also close any other browser-based communication sessions that the client device may have with other computers (e.g., other computers 156 shown in FIG. 1a). This can be accomplished by the server broadcasting a message to the other computers or intermediary devices (e.g., intermediary device 154 shown in FIG. 1*a*), wherein the broadcast message lets these other computers know that the client device (e.g., client device 152 shown in FIG. 1*a*) is no longer active and/or on line.

Figure 3:
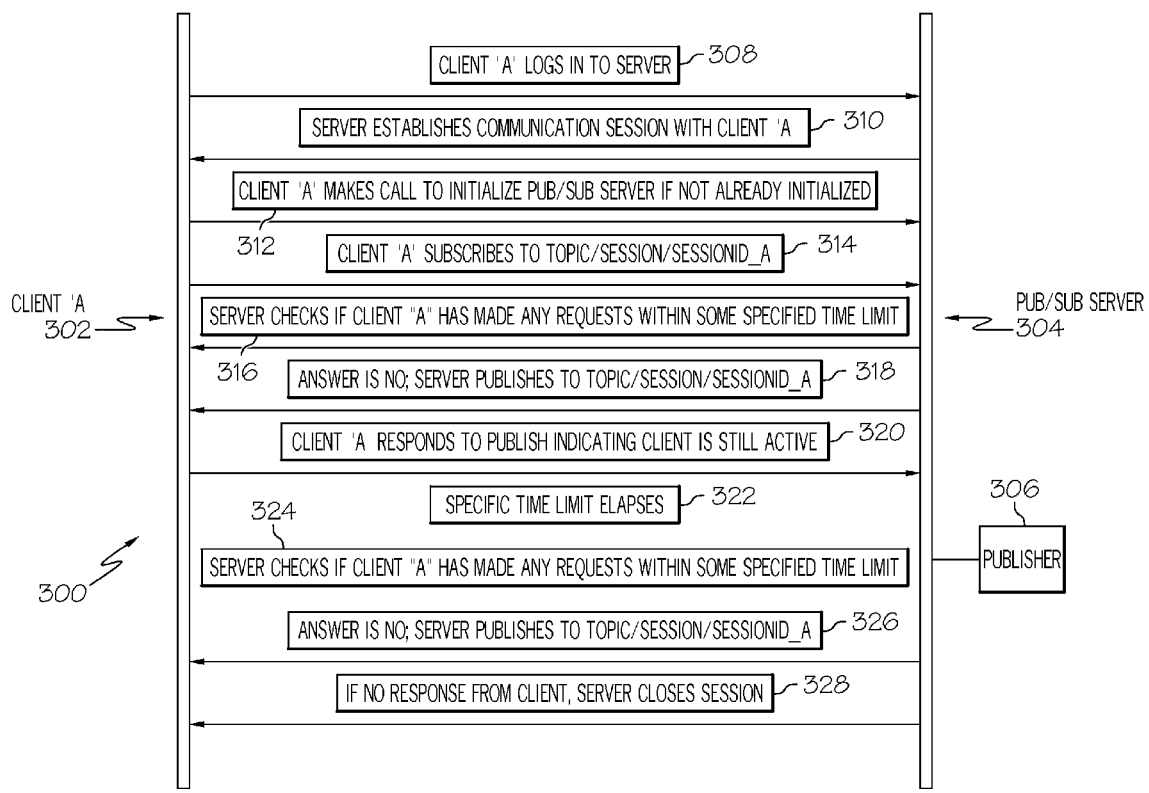
FIG. 3 is a ladder chart of exemplary steps executed by a server to utilize a publish/subscribe (pub/sub) service to determine that a communication session with a client device needs to be closed.

Referring now to FIG. 3, a ladder chart of exemplary steps taken when implementing the present invention with a publish/subscribe (pub/sub) server is presented. A pub/sub system allows a client to subscribe (sub) to content in a class. Whenever the pub/sub server obtains new content for that class from a publisher (a pub server), that class is updated in the pub/sub server. The client device (subscriber) pulls the content from the pub/sub server whenever it so desires. Thus, the actual publishers (pub servers) are typically ignorant about who is subscribing to their content. Content is sent from the pub/sub server in response to a request from the client device (i.e., the client device "pulls" the content out of the pub/sub server). By utilizing a pub/sub system with the present invention, a stateful session can be maintained between server 102 and client devices 160*a-c*

Thus, as shown in FIG. 3, the pub/sub system 300 comprises a client "A" (302) and a pub/sub server 304, which receives content from a publisher 306. As shown in block 308, Client "A" logs into pub/sub server 304, which then establishes a persistent communication session with client "A" (block 310). As shown in block 312, Client "A" initializes the pub/sub server to establish a relationship between the client "A" and the pub/sub server 304, and then Client "A" subscribes to certain topics (classes) supported and supplied by pub/sub server 304, as shown in block 314.

Referring to block 316, the pub/sub server 304 periodically checks to see if Client "A" has requested content from one or more of the topic classes found in the pub/sub server 304. That is, if some specific time limit has elapsed since Client "A" has last pulled content off the pub/sub server 304, then the pub/sub server 304 will determine if a subsequent query has been made. If not, then the pub/sub server 304 will update any topics necessary (block 318) and will send the published material to Client "A". Client "A" will then acknowledge that it received the published material (block 320), thus indicating to the pub/sub server 304 that the session needs to be kept open.

After some specific time elapses since the last request from the client device for published information (block 322), the pub/sub server 304 again checks to see if Client "A" has subsequently requested any new information (block 324). If not, then the pub/sub server 304 "pushes" the published content onto Client "A" (block 326). Thus, in block 326 the pub/sub server 304 takes over the responsibility of initiating the content, which previously was the responsibility of Client "A". If Client "A" does not appropriately respond (e.g., with a "published content received" message to the pub/sub server 304), then the pub/sub server 304 concludes that Client "A" is no longer participating in the session (e.g., Client "A" is turned off, has turned off its browser, has closed its pub/sub application, etc.), and the session is terminated by the pub/sub server 304.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
    establishing, by a first device, a communication session between the first device and a browser on a second device, wherein the communication session initially remains open on a first device-side, via a TCP/IP connection with the second device, even after the browser on the second device is subsequently closed, and wherein the communication session is a persistent HTTP session in which the TCP/IP connection persists throughout the persistent HTTP session;
    transmitting a message from the first device to the browser on the second device, wherein the message is a question;
    in response to the browser on the second device failing to actively respond to the message from the first device, terminating, by the first device, the communication session between the first device and the browser on the second device; and in response to the first device receiving an invalid response to the message, generating an error message in the server that causes said terminating of the communication session between the first device and the second device, wherein the invalid response is an illogical response to the question.

2. The method of claim 1, wherein the first device is a server, and wherein the second device is a client device.

3. The method of claim 2, further comprising:
in response to the client device failing to actively respond to the message from the first device and returning an error message to the server, removing an identifier of the client device from a server state cache in the server, wherein removal of the identifier of the client device terminates the communication session between the server and the client device.

4. The method of claim 3, wherein the error message closes any other browser-based communication sessions that the client device is currently having with other computers, wherein the other computers do not include the server, and wherein the error message is broadcast from the server to the other computers informing the other computers that the client device is no longer active.

5. The method of claim 2, wherein the client device failing to actively respond to the message results in an error message being generated by the server, and wherein the error message prompts the server to terminate the communication session between the client device and the server.

6. The method of claim 5, wherein the error message prompts the server to terminate other browser-based communication sessions between the client device and a set of other computers, wherein the set of other computers excludes the server.

7. The method of claim 1, wherein the first device is a publish/subscribe (pub/sub) server that maintains a persistent communication session between the first device and the second device by keeping a TCP/IP session between the pub/sub server and the second device alive while the persistent communication session remains open and multiple messages are exchanged between the first device and the browser on the second device.

8. The method of claim 7, wherein the message from the pub/sub server is a publish response to a subscription that was established by the client device.

9. The method of claim 7, wherein the message from the pub/sub server is prompted by a specific time limit elapsing since the client device responded to a publish message from the pub/sub server.

10. A computer program product for controlling a communication session, said computer program product comprising:
a non-transitory computer usable storage medium having computer usable program code embodied therewith, said computer usable program code comprising:
computer usable program code configured to establish a communication session between a first device and a second device, wherein the communication session initially remains open even if said second device is subsequently disabled;
computer usable program code configured to transmit a message from the first device to a browser on the second device, wherein the message is a question;
computer usable program code configured to, in response to the browser on the second device failing to actively respond to the message from the first device, terminate the communication session between the first device and the browser on the second device; and
computer usable program code configured to, in response to the first device receiving an invalid response to the message, generate an error message in the server that causes termination of the communication session between the first device and second device, wherein the invalid response is an illogical response to the question.

11. The computer program product of claim 10, wherein the first device is a server, and wherein the second device is a client device.

12. The computer program product of claim 11, wherein the client device failing to actively respond to the message results in an error message being sent from the client device to the server, and wherein the error message prompts the server to terminate the communication session between the client device and the server.

13. The computer program product of claim 12, wherein the error message prompts the server to terminate other communication sessions between the client device and a set of other computers, wherein the set of other computers excludes the server.

14. The computer program product of claim 11, wherein the client device failing to actively respond to the message results in an error message being generated by the server, and wherein the error message prompts the server to terminate the communication session between the client device and the server.

15. A system comprising:
a suitably configure hardware device for controlling a communication session by:
establishing a communication session with a browser on a client device, wherein the communication session initially remains open even if the browser on the client device is subsequently closed;
transmitting a message to the browser on the client device, wherein the message is a question;
in response to the browser on the second device failing to actively respond to the message, terminating the communication session with the client device; and
in response to receiving an invalid response to the message, generating an error message in the server that causes said terminating of the communication session between the first device and the second device, wherein the invalid response is an illogical response to the question.

16. The system of claim 15, wherein the communication session is between the client device and a server.

17. The system of claim 16, wherein the client device failing to actively respond to the message results in an error message being sent from the client device to the server, and wherein the error message prompts the server to terminate the communication session between the client device and the server.

18. The system of claim 17, wherein the error message prompts the server to terminate other browser-based communication sessions between the client device and a set of other computers, wherein the set of other computers excludes the server.

19. The system of claim 16, wherein the client device failing to actively respond to the message results in an error message being generated by the server, and wherein the error message prompts the server to terminate the communication session between the client device and the server.

* * * * *